(12) United States Patent
Sensui (10) Patent No.: US 7,277,235 B2
(45) Date of Patent: Oct. 2, 2007

(54) ZOOM LENS SYSTEM

(75) Inventor: Takayuki Sensui, Tokyo (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 11/516,712

(22) Filed: Sep. 7, 2006

(65) Prior Publication Data

US 2007/0070522 A1   Mar. 29, 2007

(30) Foreign Application Priority Data

Sep. 29, 2005  (JP) ............................. 2005-285400

(51) Int. Cl.
G02B 15/14 (2006.01)
(52) U.S. Cl. .................................... 359/687
(58) Field of Classification Search ................ 359/683, 359/687
See application file for complete search history.

(56) References Cited

U.S. PATENT DOCUMENTS 5,557,470 A * 9/1996 Shibayama ................. 359/687
5,699,198 A   12/1997 Inadome et al.
6,621,643 B2  9/2003 Sato
6,791,762 B2  9/2004 Yamada

FOREIGN PATENT DOCUMENTS

| JP | 8-248319 A | 9/1996 |
|---|---|---|
| JP | 11-352400 A | 12/1999 |
| JP | 2002-323655 A | 11/2002 |

* cited by examiner

Primary Examiner—Scott J. Sugarman
(74) Attorney, Agent, or Firm—Miles & Stockbridge PC (57) ABSTRACT

Providing a zoom lens system that has a high zoom ratio, high optical performance, and compactness, and is easy to be manufactured. The zoom lens system includes, in order from an object, a first lens group having positive refractive power, a second lens group having negative refractive power, a third lens group having positive refractive power, and a fourth lens group having positive refractive power. Zooming from a wide-angle end state to a telephoto end state is carried out by moving each lens group along the optical axis such that a distance between the first lens group and the second lens group increases, a distance between the second lens group and the third lens group decreases, a distance between the third lens group and the fourth lens group decreases. A zoom ratio is 5.0 or more. Given conditional expressions are satisfied.

17 Claims, 8 Drawing Sheets

ZOOM LENS SYSTEM

The disclosure of the following priority application is herein incorporated by reference:

Japanese Patent Application No. 2005-285400 filed on Sep. 29, 2005.

BACKGROUND OF THE INVENTION

1. Field of the Invention

The present invention relates to a zoom lens system.

2. Related Background Art

There has been proposed a lot of so-called positive leading type four-lens-group zoom lens systems composed of, in order from an object, a first lens group having positive refractive power, a second lens group having negative refractive power, a third lens group having positive refractive power, and a fourth lens group having positive refractive power, and carrying out zooming by varying distances between lens groups in Japanese Patent Application Laid-Open Nos. 8-248319 and 2002-323655.

A characteristic of a zoom lens system of this type is to be able to obtain a high zoom ratio by actively varying a distance between the first lens group and the second lens group, and a distance between the second lens group and the third lens group. Moreover, in a zoom lens system of this type, by slightly changing a distance between the third lens group and the fourth lens group, both of which have positive refractive power, variation in curvature of field liable to be a problem in a high zoom ratio zoom lens can be corrected, so that excellent optical performance can be accomplished.

However, in such conventional zoom lens system mentioned above, the fact that large aberrations generated upon zooming can be corrected by slightly changing the distance between the third lens group and the fourth lens group means that variation in the very distances have a significantly large influence (hereinafter called "distance variation sensitivity") on deterioration in optical performance, and that decentering between the third lens group and the fourth lens group have a considerably large influence (hereinafter called "decentering sensitivity") on deterioration in optical performance. Accordingly, high precision is to be required upon manufacturing the zoom lens system.

Moreover, in such conventional zoom lens system mentioned above, since zooming is carried out by varying distances before and after the second lens group having large refractive power, decentering sensitivity of the second lens group also becomes high. This also requires high precision upon manufacturing the zoom lens system.

SUMMARY OF THE INVENTION

The present invention is made in view of the aforementioned problems and has an object to provide a zoom lens system that has a high zoom ratio, high optical performance, and compactness, and is easy to be manufactured.

According to a first aspect of the present invention, there is provided a zoom lens system includes, in order from an object, a first lens group having positive refractive power, a second lens group having negative refractive power, a third lens group having positive refractive power, and a fourth lens group having positive refractive power. Zooming from a wide-angle end state to a telephoto end state is carried out by moving each lens group along the optical axis such that a distance between the first lens group and the second lens group increases, a distance between the second lens group and the third lens group decreases, a distance between the third lens group and the fourth lens group decreases. A zoom ratio of the zoom lens system is 5.0 or more. The following conditional expressions (1), (2), and (3) are satisfied:

$$2.78 \leq 100 \cdot (D3w - D3t)/(Z \cdot IL) \leq 9.1 \quad (1)$$

$$0.55 \leq 10 \cdot (D2w - D2t)/(Z \cdot IL) \leq 3.1 \quad (2)$$

$$0.81 \leq f3/f4 \leq 6.0 \quad (3)$$

where D2w denotes a distance between the second lens group and the third lens group in the wide-angle end state upon focusing on infinity, D2t denotes a distance between the second lens group and the third lens group in the telephoto end state upon focusing on infinity, D3w denotes a distance between the third lens group and the fourth lens group in the wide-angle end state upon focusing on infinity, D3t denotes a distance between the third lens group and the fourth lens group in the telephoto end state upon focusing on infinity, IL denotes a diagonal length of an effective image, f3 denotes a focal length of the third lens group, f4 denotes a focal length of the fourth lens group, and Z denotes a zoom ratio.

In a zoom lens system according to the first aspect of the present invention, the following conditional expressions (4) and (5) are preferably satisfied:

$$3.35 \cdot fw \leq f1 \leq 0.67 \cdot ft \quad (4)$$

$$0.55 \leq fw/IL \leq 0.83 \quad (5)$$

where fw denotes a focal length of the zoom lens system in the wide-angle end state, ft denotes a focal length of the zoom lens system in the telephoto end state, and f1 denotes a focal length of the first lens group.

In a zoom lens system according to the first aspect of the present invention, the following conditional expression (6) is preferably satisfied:

$$1.1 < fw/(-f2) < 2.2 \quad (6)$$

where fw denotes a focal length of the zoom lens system in the wide-angle end state, and f2 denotes a focal length of the second lens group.

In a zoom lens system according to the first aspect of the present invention, it is preferable that the first lens group includes, in order from the object, a cemented lens constructed by a negative meniscus lens having a convex surface facing the object cemented with a double convex positive lens, and a positive meniscus lens having a convex surface facing the object.

In a zoom lens system according to the first aspect of the present invention, it is preferable that the second lens group includes, in order from the object, a negative lens, a negative lens, a positive lens, and a negative lens.

In a zoom lens system according to the first aspect of the present invention, it is preferable that the second lens group includes, in order from the object, a negative lens that has stronger curvature on the image side surface than on the object side surface and has a concave surface facing the image, a double concave negative lens, a double convex positive lens, and a negative lens that has stronger curvature on the object side surface than on the image side surface and has a concave surface facing the object.

In a zoom lens system according to the first aspect of the present invention, it is preferable that the most object side lens surface of the second lens group is an aspherical surface.

In a zoom lens system according to the first aspect of the present invention, it is preferable that the third lens group has an aperture stop on the most object side thereof.

In a zoom lens system according to the first aspect of the present invention, it is preferable that the third lens group includes, in order from the image, a negative lens, and a positive lens.

In a zoom lens system according to the first aspect of the present invention, it is preferable that the third lens group is composed of three lenses or less.

In a zoom lens system according to the first aspect of the present invention, it is preferable that the fourth lens group includes at least one aspherical surface.

In a zoom lens system according to the first aspect of the present invention, it is preferable that the fourth lens group includes, in order from the object, a positive lens, a positive lens, a negative lens, and a positive lens.

In a zoom lens system according to the first aspect of the present invention, it is preferable that only spherical surfaces are used on the lens surfaces of the first lens group.

According to a second aspect of the present invention, there is provided a method for forming an image of an object and varying a focal length of a zoom lens system that includes, in order from the object, a first lens group having positive refractive power, a second lens group having negative refractive power, a third lens group having positive refractive power, and a fourth lens group having positive refractive power, including steps of varying the focal length by moving each lens group along an optical axis, increasing a distance between the first lens group and the second lens group, decreasing a distance between the second lens group and the third lens group, and decreasing a distance between the third lens group and the fourth lens group when the zoom lens system moves from a wide-angle end state to a telephoto end state, securing a zoom ratio of 5.0 or more, and satisfying the following conditional expressions (1), (2), and (3):

$$2.78 \leq 100 \cdot (D3w-D3t)/(Z \cdot IL) \leq 9.1 \quad (1)$$

$$0.55 \leq 10 \cdot (D2w-D2t)/(Z \cdot IL) 3.1 \quad (2)$$

$$0.81 \leq f3/f4 \leq 6.0 \quad (3)$$

where D2w denotes a distance between the second lens group and the third lens group in the wide-angle end state upon focusing on infinity, D2t denotes a distance between the second lens group and the third lens group in the telephoto end state upon focusing on infinity, D3w denotes a distance between the third lens group and the fourth lens group in the wide-angle end state upon focusing on infinity, D3t denotes a distance between the third lens group and the fourth lens group in the telephoto end state upon focusing on infinity, IL denotes a diagonal length of an effective image, f3 denotes a focal length of the third lens group, f4 denotes a focal length of the fourth lens group, and Z denotes a zoom ratio.

In the second aspect of the present invention, the following step is preferably included:

satisfying the following conditional expressions (4) and (5):

$$3.35 \cdot fw \leq f1 \leq 0.67 \cdot ft \quad (4)$$

$$0.55 \leq fw/IL \leq 0.83 \quad (5)$$

where fw denotes a focal length of the zoom lens system in the wide-angle end state, ft denotes a focal length of the zoom lens system in the telephoto end state, and f1 denotes a focal length of the first lens group.

In the second aspect of the present invention, the following step is preferably included:

satisfying the following conditional expression (6):

$$1.1 < fw/(-f2) < 2.2 \quad (6)$$

where fw denotes a focal length of the zoom lens system in the wide-angle end state, and f2 denotes a focal length of the second lens group.

Other features and advantages according to the present invention will be readily understood from the detailed description of the preferred embodiments in conjunction with the accompanying drawings.

BRIEF DESCRIPTION OF THE DRAWINGS

FIGS. 2A, 2B, and 2C are graphs showing various aberrations of the zoom lens system according to Example 1 focusing on infinity in which

FIGS. 4A, 4B, and 4C are graphs showing various aberrations of the zoom lens system according to Example 2 focusing on infinity in which

FIGS. 6A, 6B, and 6C are graphs showing various aberrations of the zoom lens system according to Example 3 focusing on infinity in which

FIGS. 8A, 8B, and 8C are graphs showing various aberrations of the zoom lens system according to Example 4 focusing on infinity in which

DESCRIPTION OF THE MOST PREFERRED EMBODIMENTS

A zoom lens system according to an embodiment of the present invention is explained below.

The zoom lens system includes, in order from an object, a first lens group having positive refractive power, a second lens group having negative refractive power, a third lens group having positive refractive power, and a fourth lens group having positive refractive power. Zooming from a wide-angle end state to a telephoto end state is carried out by moving each lens group along the optical axis such that a distance between the first lens group and the second lens group increases, a distance between the second lens group and the third lens group decreases, a distance between the third lens group and the fourth lens group decreases. The following conditional expressions (1), (2), and (3) are satisfied:

$$2.78 \leq 100 \cdot (D3w - D3t)/(Z \cdot IL) \leq 9.1 \quad (1)$$

$$0.55 \leq 10 \cdot (D2w - D2t)/(Z \cdot IL) \leq 3.1 \quad (2)$$

$$0.81 \leq f3/f4 \leq 6.0 \quad (3)$$

where D2w denotes a distance between the second lens group and the third lens group in the wide-angle end state upon focusing on infinity, D2t denotes a distance between the second lens group and the third lens group in the telephoto end state upon focusing on infinity, D3w denotes a distance between the third lens group and the fourth lens group in the wide-angle end state upon focusing on infinity, D3t denotes a distance between the third lens group and the fourth lens group in the telephoto end state upon focusing on infinity, IL denotes a diagonal length of an effective image, f3 denotes a focal length of the third lens group, f4 denotes a focal length of the fourth lens group, and Z denotes a zoom ratio.

The zoom lens system is a positive-leading four-lens-group zoom lens system in which roles are shared to each lens group such that zooming is mainly carried out by varying a distance between the first lens group and the second lens group and a distance between the second lens group and the third lens group, and correction of variation in aberration is mainly carried out by varying a distance between the third lens group and the fourth lens group. In order to reduce distance variation sensitivity of the distance between the third lens group and the fourth lens group, it is sufficient that a variation amount with respect to zoom ratio is set to be large, so that decentering sensitivity is also reduced accordingly. Here, the zoom ratio is a ratio of a focal length in a telephoto end state to that in the wide-angle end state of the zoom lens system.

Conditional expression (1) defines variation in the distance between the third lens group and the fourth lens group with respect to a unit zoom ratio normalized by the diagonal length of the effective image, and defines imaging sensitivity with respect to decentering between the third lens group and the fourth lens group, in other words, decentering sensitivity between the third lens group and the fourth lens group.

In the zoom lens system, when the value $100 \cdot (D3w - D3t)/(Z \cdot IL)$ falls below the lower limit of conditional expression (1), distance variation sensitivity and decentering sensitivity become too sensitive, so that a minute manufacturing error generates various aberrations, decentering coma in the telephoto end state, and, in particular, a large amount of curvature of field over entire focal length range.

When the lower limit of conditional expression (1) is set to 3.30, it becomes possible to further reduce decentering sensitivity to secure higher optical performance.

On the other hand, in the zoom lens system, when the value $100 \cdot (D3w - D3t)/(Z \cdot IL)$ exceeds the upper limit of conditional expression (1), variation in the distance becomes excessively large, so that the fourth lens group has to be near to the image in the wide-angle end state. Accordingly, it becomes difficult to secure the back focal length. In order to secure a sufficient back focal length, power of the second lens group has to be strong, so that it becomes difficult to correct distortion in the wide-angle end state and astigmatism over entire focal length range.

When the upper limit of conditional expression (1) is set to 7.5, it becomes possible to further reduce decentering sensitivity to secure higher optical performance.

Conditional expression (2) defines variation in the distance between the second lens group and the third lens group with respect to a unit zoom ratio normalized by the diagonal length of the effective image, and defines imaging sensitivity with respect to decentering in the second lens group, in other words, decentering sensitivity in the second lens group.

In the zoom lens system, when the value $10 \cdot (D2w - D2t)/(Z \cdot IL)$ falls below the lower limit of conditional expression (2), a large zoom ratio has to be secured by a small variation in the distance, so that distance variation sensitivity and decentering sensitivity become too sensitive, and a minute manufacturing error generates various aberrations, in particular, a large amount of curvature of field in the telephoto end state.

When the lower limit of conditional expression (2) is set to 0.63, it becomes possible to further reduce decentering sensitivity to secure higher optical performance.

On the other hand, in the zoom lens system, when the value $10 \cdot (D2w - D2t)/(Z \cdot IL)$ exceeds the upper limit of conditional expression (2), variation in the distance becomes excessively large, so that lens groups on and after the third lens group have to be near to the image, or the first lens group has to be near to the object. Accordingly, it becomes difficult to secure the back focal length. In order to secure a sufficient back focal length, power of the second lens group has to be strong, so that it becomes difficult to correct distortion in the wide-angle end state and astigmatism over entire focal length range.

When the upper limit of conditional expression (2) is set to 1.5, it becomes possible to further reduce decentering sensitivity to secure higher optical performance.

Conditional expression (3) defines an appropriate range of the ratio of a focal length of the third lens group to that of the fourth lens group, makes the lens diameter small, and secures a good aberration correction state.

In the zoom lens system, when the ratio f3/f4 falls below the lower limit of conditional expression (3), power of the third lens group becomes excessively strong, and correction of spherical aberration in the vicinity of telephoto end state is carried out exclusively by the third lens group, so that it becomes difficult to secure excellent optical performance.

On the other hand, in the zoom lens system, when the ratio f3/f4 exceeds the upper limit of conditional expression (3), power of the fourth lens group becomes excessively strong. Accordingly, curvature of field and coma are generated in the wide-angle end state, deterioration in optical performance in the peripheral image becomes conspicuous, and the diameter of the fourth lens group becomes large to increase the outer diameter of the lens barrel.

In the zoom lens system, the following conditional expressions (4) and (5) are preferably satisfied:

$$3.35 \cdot fw \leq f1 \leq 0.67 \cdot ft \quad (4)$$

$$0.55 \leq fw/IL \leq 0.83 \quad (5)$$

where fw denotes a focal length of the zoom lens system in the wide-angle end state, ft denotes a focal length of the zoom lens system in the telephoto end state, and f1 denotes a focal length of the first lens group.

Conditional expression (4) defines an appropriate range of the power of the first lens group, and is for correcting spherical aberration mainly in the telephoto end state and suppressing the total lens length of the zoom lens system.

In the zoom lens system, when the value f1 falls below the lower limit of conditional expression (4), power of the first lens group becomes excessively weak. Accordingly, in order to suppress the total lens length of the zoom lens system which is the longest in the telephoto end state, power of the second lens group has to be strong, so that it becomes difficult to correct distortion in the wide-angle end state and astigmatism over entire focal length range.

On the other hand, in the zoom lens system, when the value f1 exceeds the upper limit of conditional expression (4), power of the first lens group becomes excessively strong. Accordingly, aberration in the telephoto side generated in the first lens group, in particular, spherical aberration is largely generated, so that it becomes difficult to correct aberration by the lens groups after the first lens group.

Conditional expression (5) defines an appropriate range of a ratio of a focal length of the zoom lens system in the wide-angle end state to the diagonal length of the effective image, and defines an angle of view.

In the zoom lens system, when the ratio fw/IL falls below the lower limit of conditional expression (5), it becomes difficult to correct distortion in the wide-angle end state.

On the other hand, in a zoom lens system, when the ratio fw/IL exceeds the upper limit of conditional expression (5), in order to suppress the total lens length of the zoom lens system, power of the second lens group has to be strong, so that it becomes difficult to correct distortion in the wide-angle end state and astigmatism over entire focal length range.

In the zoom lens system, the following conditional expression (6) is preferably satisfied:

$$1.1 < fw/(-f2) < 2.2 \quad (6)$$

where fw denotes a focal length of the zoom lens system in the wide-angle end state, and f2 denotes a focal length of the second lens group.

Conditional expression (6) defines power of the second lens group, and is for securing a high zoom ratio by making the total lens length of the zoom lens system in the telephoto end state short with keeping optical performance excellently.

In the zoom lens system, when the ratio fw/(−f2) is equal to or falls below the lower limit of conditional expression (6), power of the second lens group becomes excessively weak. In order to suppress a moving amount of each lens group which increases upon zooming, power of the first lens group has to be strong, so that correction of spherical aberration particularly in the telephoto end state becomes worse.

On the other hand, in the zoom lens system, when the ratio fw/(−f2) is equal to or exceeds the upper limit of conditional expression (6), power of the second lens group becomes excessively strong. Although this is advantageous for zooming, it becomes difficult to correct aberrations generated in the second lens group by means of the other lens groups.

In the zoom lens system, with satisfying the above-described conditional expressions, it becomes possible to provide a zoom lens system having a large angle of view in the wide-angle end state, a high zoom ratio of five or more upon focusing on infinity, further high optical performance, and low decentering sensitivity, and easy to be manufactured.

In the zoom lens system, in order to reduce decentering sensitivity, and to correct aberrations such as spherical aberration for securing high optical performance, it is preferable that the first lens group includes, in order from the object, a cemented lens constructed by a negative meniscus lens having a convex surface facing the object cemented with a double convex positive lens, and a positive meniscus lens having a convex surface facing the object.

In the zoom lens system, in order to reduce decentering sensitivity, and to correct aberrations such as spherical aberration for securing high optical performance, it is preferable that the second lens group includes, in order from the object, a double concave negative lens or a negative meniscus lens that has stronger curvature on the image side surface than on the object side surface and has a concave surface facing the image, a double concave negative lens, a double convex positive lens, and a double concave negative lens or a negative meniscus lens that has stronger curvature on the object side surface than on the image side surface and has a concave surface facing the object.

In the zoom lens system, in order to reduce decentering sensitivity, and to correct aberrations such as spherical aberration for securing high optical performance, it is preferable that the most object side lens surface of the second lens group is an aspherical surface.

In the zoom lens system, in order to reduce decentering sensitivity, and to correct aberrations such as spherical aberration for securing high optical performance, it is preferable that the third lens group has an aperture stop on the most object side thereof.

The zoom lens system according to each Example will be explained below with reference to accompanying drawings.

EXAMPLE 1

Figure 1:
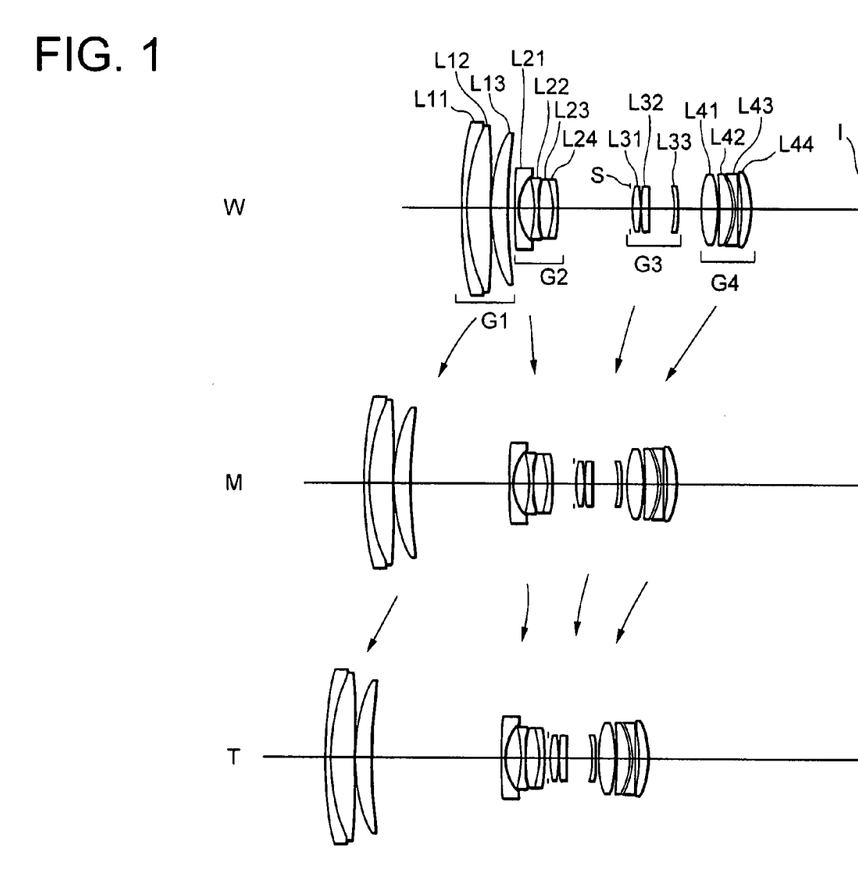
FIG. 1 is a diagram showing a lens configuration of a zoom lens system according to Example 1 together with zooming trajectories of respective lens groups.

FIG. 1 is a diagram showing a lens configuration of a zoom lens system according to Example 1 together with zooming trajectories of respective lens groups.

The zoom lens system according to Example 1 is composed of, in order from the object, a first lens group G1 having positive refractive power, a second lens group G2 having negative refractive power, a third lens group G3 having positive refractive power, and a fourth lens group G4 having positive refractive power. When zooming from a wide-angle end state (W) to a telephoto end state (T), respective lens groups G1, G2, G3, and G4 are moved along the optical axis such that a distance between the first lens group G1 and the second lens group G2 increases, a distance between the second lens group G2 and the third lens group G3 decreases, and a distance between the third lens group G3 and the fourth lens group G4 decreases.

The first lens group G1 is composed of, in order from the object, a cemented lens constructed by a negative meniscus lens L11 having a convex surface facing the object cemented with a double convex positive lens L12, and a positive meniscus lens L13 having a convex surface facing the object.

The second lens group G2 is composed of, in order from the object, a negative meniscus lens L21 having a convex surface facing the object, a double concave negative lens L22, a double convex positive lens L23, and a negative meniscus lens L24 having a convex surface facing the image.

The third lens group G3 is composed of, in order from the object, an aperture stop S, a double convex positive lens L31, a positive meniscus lens L32 having a convex surface facing the object, and a negative meniscus lens L33 having a convex surface facing the image. The aperture stop S is moved in a body together with respective lenses composing the third lens group upon zooming.

The fourth lens group G4 is composed of, in order from the object, a double convex positive lens L41, a positive meniscus lens L42 having a convex surface facing the image, a negative meniscus lens L43 having a convex surface facing the image, and a positive meniscus lens L44 having a convex surface facing the image.

Various values associated with the zoom lens system according to Example 1 are listed in Table 1.

In [Specifications], f denotes a focal length, FNO denotes the f-number, and 2ω denotes an angle of view.

In [Lens Data], the left most column shows the lens surface number counted in order from the object side, the second column shows a radius of curvature "r", the third column shows a distance "d" along the optical axis between the lens surfaces, the fourth column shows refractive index "n" of the medium between the lens surfaces at d-line (wavelength λ=587.6 nm), and the fifth column shows Abbe number of the medium "ν" between the lens surfaces at d-line (wavelength λ=587.6 nm). The position of an aspherical-surface is expressed by attaching "*" to the right side of the surface number in [Lens Data] and paraxial radius of curvature is shown in the second column. In [Lens Data], refractive index of the air n=1.000000 is omitted.

In [Aspherical Data], "κ" denotes a conical coefficient, "Ci" denotes an i-th order aspherical coefficient, and "E-n" denotes "$10^{-n}$". In each Example, an aspherical surface is exhibited by the following expression:

$$X(y)=(y^2/r)/[1+[1-\kappa(y^2/r^2)]^{1/2}]+C4 \times y^4+C6 \times y^6+C8 \times y^8+C10 \times y^{10}+C12 \times y^{12}$$

where y denotes a vertical height from the optical axis, X(y) denotes a sag amount which is a distance along the optical axis from the tangent surface at the vertex of the aspherical surface to the aspherical surface at the vertical height y from the optical axis, r denotes a radius of curvature of a reference sphere, κ denotes a conical coefficient, and Cn denotes aspherical coefficient of n-th order.

In [Lens Data] and [Variable Distances], Bf denotes a back focal length. In [Specifications] and [Variable Distances], W, M, and T denote a wide-angle end state, an intermediate focal length state, and a telephoto end state T, respectively.

In the tables for various values, "mm" is generally used for the unit of length such as the focal length, the radius of curvature, and the distance to the next lens surface. However, since an optical system proportionally enlarged or reduced its dimension can be obtained similar optical performance, the unit is not necessary to be limited to "mm", and any other suitable unit can be used.

The explanation of reference symbols is the same in the other examples, so that duplicated explanations are omitted.

TABLE 1

[Specifications]

|   | W | T |
|---|---|---|
| f = | 18.5 | 130.9 |
| FNO = | 3.8 | 5.9 |
| 2ω = | 77.8 | 12.1° |

[Lens Data]

| | r | d | n | ν |
|---|---|---|---|---|
| 1 | 126.5788 | 1.3000 | 1.84666 | 23.78 |
| 2 | 62.9349 | 8.0000 | 1.62041 | 60.29 |
| 3 | −959.3109 | 0.1000 | | |
| 4 | 52.1972 | 5.3104 | 1.63854 | 55.38 |
| 5 | 154.0444 | D5 | | |

TABLE 1-continued

| 6* | 512.7257 | 0.1000 | 1.55389 | 38.09 |
|---|---|---|---|---|
| 7 | 253.6448 | 1.0000 | 1.80610 | 40.94 |
| 8 | 14.3723 | 5.5584 | | |
| 9 | −31.2202 | 1.0000 | 1.80400 | 46.58 |
| 10 | 35.7077 | 0.2000 | | |
| 11 | 29.2887 | 4.8000 | 1.84666 | 23.78 |
| 12 | −23.7594 | 0.3500 | | |
| 13 | −20.8706 | 1.0000 | 1.83400 | 37.17 |
| 14 | −99.6658 | D14 | | |
| 15 | | 0.5000 | Aperture Stop S | |
| 16 | 32.8767 | 2.8000 | 1.49700 | 81.61 |
| 17 | −122.8806 | 0.1000 | | |
| 18 | 37.4982 | 2.8002 | 1.48749 | 70.24 |
| 19 | 976.1324 | 8.4450 | | |
| 20 | −26.4571 | 1.0000 | 1.84666 | 23.78 |
| 21 | −75.5039 | D21 | | |
| 22 | 35.9134 | 5.1670 | 1.51633 | 64.14 |
| 23 | −42.6826 | 0.5998 | | |
| 24 | −394.9746 | 4.5688 | 1.51823 | 58.96 |
| 25 | −23.1325 | 0.8638 | | |
| 26 | −21.8212 | 1.0000 | 1.80400 | 46.58 |
| 27 | −301.1549 | 0.0500 | 1.55389 | 38.09 |
| 28* | −101.3732 | 1.0000 | | |
| 29 | −76.2405 | 3.2000 | 1.48749 | 70.24 |
| 30 | −26.5516 | Bf | | |

[Aspherical Data]

Surface Number 6

κ = 0.00
C4 = 1.34780E−05
C6 = −4.19530E−08
C8 = 2.53920E−10
C10 = −1.18210E−12
C12 = 0.25331E−14

Surface Number 28

κ = 0.00
C4 = 2.70980E−05
C6 = −2.69790E−09
C8 = 4.40790E−10
C10 = −5.15070E−12
C12 = 0.17994E−13

[Variable Distances]

| | W | M | T |
|---|---|---|---|
| f | 18.50 | 69.99 | 130.94 |
| D5 | 2.61 | 32.84 | 43.56 |
| D14 | 24.56 | 7.36 | 1.50 |
| D21 | 8.01 | 2.48 | 1.10 |
| Bf | 38.10 | 61.00 | 72.34 |

[Values for Conditional Expressions]

(1): 100 · (D3w − D3t)/(Z · IL) = 3.46
(2): 10 · (D2w − D2t)/(Z · IL) = 1.16
(3): f3/f4 = 1.57
(4): fw = 18.50
    f1 = 84.186
    ft = 130.94
(5): fw/IL = 0.66
(6): fw/(−f2) = 1.32

Figure 2A:
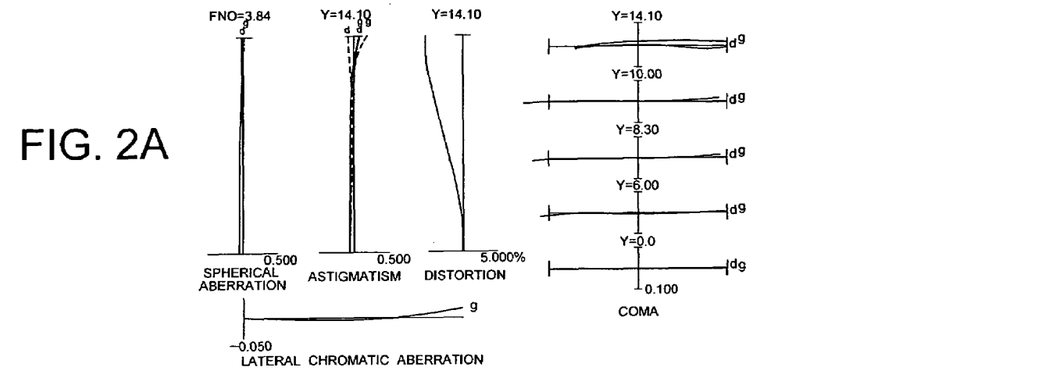
FIG. 2A shows various aberrations in a wide-angle end state W.
Figure 2B:
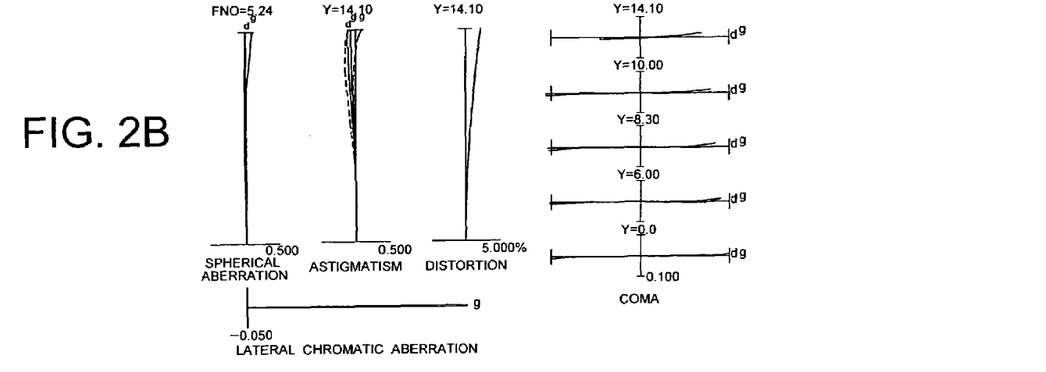
FIG. 2B shows various aberrations in an intermediate focal length state M.
Figure 2C:
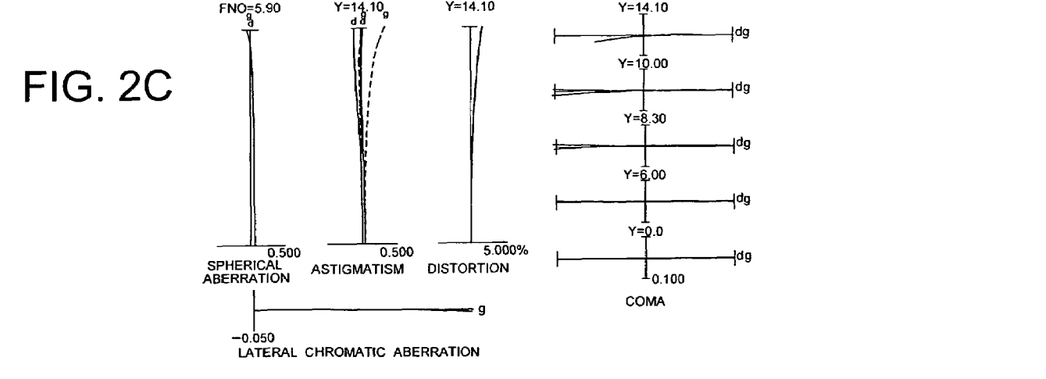
FIG. 2C shows various aberrations in a telephoto end state T.

FIGS. 2A, 2B, and 2C are graphs showing various aberrations of the zoom lens system according to Example 1 focusing on infinity in which FIG. 2A shows various aberrations in a wide-angle end state W, FIG. 2B shows various aberrations in an intermediate focal length state M, and FIG. 2C shows various aberrations in a telephoto end state T.

In respective graphs, FNO denotes an f-number, Y denotes an image height. In graphs showing astigmatism and distortion, the maximum value of an image height Y is shown. In respective graphs, d denotes aberration curve at d-line (wavelength λ=587.6 nm), and g denotes aberration curve at g-line (wavelength λ=435.8 nm).

In the graphs showing spherical aberration, FNO denotes the f-number with respect to the maximum aperture.

In the graph showing astigmatism, a solid line indicates a sagittal image plane, and a broken line indicates a meridional image plane.

In graphs showing coma, coma with respect to each image height is shown.

The above-described explanation regarding various aberration graphs is the same as the other Examples.

As is apparent from the respective graphs, the zoom lens system according to Example 1 shows superb optical performance as a result of good corrections to various aberrations in the wide-angle end state, in the intermediate focal length state, and in the telephoto end state.

EXAMPLE 2

Figure 3:
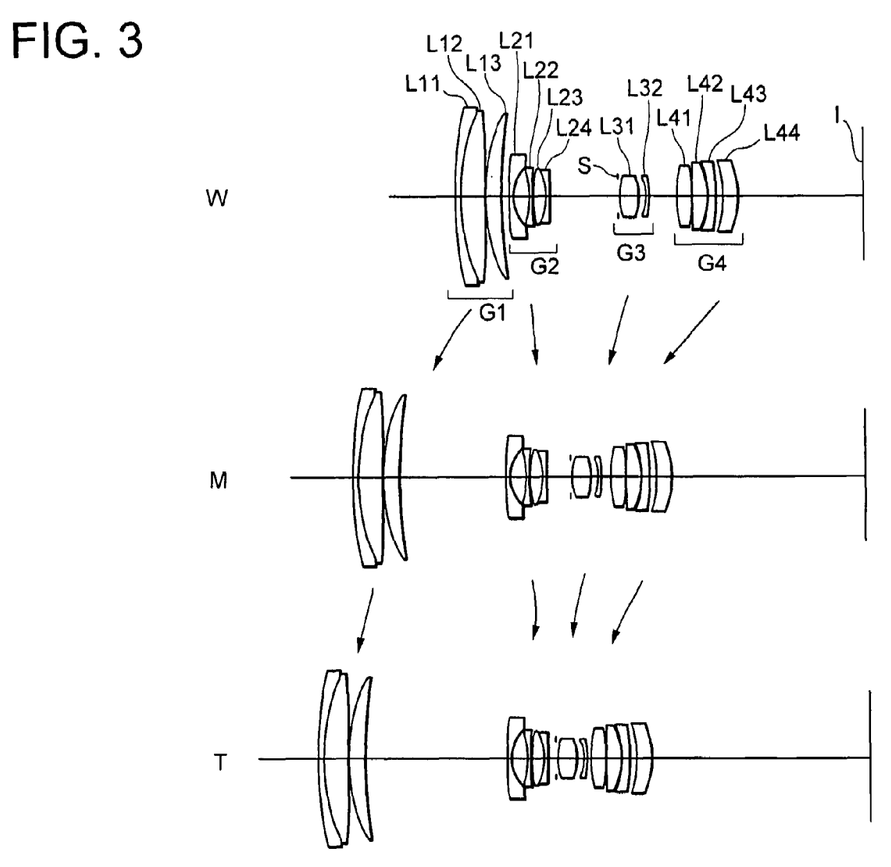
FIG. 3 is a diagram showing a lens configuration of a zoom lens system according to Example 2 together with zooming trajectories of respective lens groups.

FIG. 3 is a diagram showing a lens configuration of a zoom lens system according to Example 2 together with zooming trajectories of respective lens groups.

The zoom lens system according to Example 2 is composed of, in order from the object, a first lens group G1 having positive refractive power, a second lens group G2 having negative refractive power, a third lens group G3 having positive refractive power, and a fourth lens group G4 having positive refractive power. When zooming from a wide-angle end state (W) to a telephoto end state (T), respective lens groups G1, G2, G3, and G4 are moved along the optical axis such that a distance between the first lens group G1 and the second lens group G2 increases, a distance between the second lens group G2 and the third lens group G3 decreases, and a distance between the third lens group G3 and the fourth lens group G4 decreases.

The first lens group G1 is composed of, in order from the object, a cemented lens constructed by a negative meniscus lens L11 having a convex surface facing the object cemented with a positive meniscus lens L12 having a convex surface facing the object, and a positive meniscus lens L13 having a convex surface facing the object.

The second lens group G2 is composed of, in order from the object, a negative meniscus lens L21 having a convex surface facing the object, a double concave negative lens L22, a double convex positive lens L23, and a double concave negative lens L24.

The third lens group G3 is composed of, in order from the object, an aperture stop S, a double convex positive lens L31, and a negative meniscus lens L32 having a convex surface facing the image. The aperture stop S is moved in a body together with respective lenses composing the third lens group upon zooming.

The fourth lens group G4 is composed of, in order from the object, a double convex positive lens L41, a double convex positive lens L42, a negative meniscus lens L43 having a convex surface facing the image, and a positive meniscus lens L44 having a convex surface facing the image.

Various values associated with the zoom lens system according to Example 2 are listed in Table 2.

TABLE 2

[Specifications]

|  | W | T |
|---|---|---|
| f= | 18.5 | 130.9 |
| FNO= | 3.8 | 5.9 |
| 2ω= | 77.7 | 12.2° |

TABLE 2-continued

[Lens Data]

|  | r | d | n | ν |
|---|---|---|---|---|
| 1 | 110.5931 | 1.5000 | 1.84666 | 23.78 |
| 2 | 63.3145 | 8.0924 | 1.61800 | 63.38 |
| 3 | 12416.2260 | 0.1000 |  |  |
| 4 | 51.8758 | 5.8267 | 1.61800 | 63.38 |
| 5 | 139.1383 | D5 |  |  |
| 6* | 165.0473 | 0.2000 | 1.55389 | 38.09 |
| 7 | 149.3325 | 1.0000 | 1.80610 | 40.94 |
| 8 | 13.3098 | 5.4349 |  |  |
| 9 | −37.8165 | 0.9000 | 1.80400 | 46.58 |
| 10 | 57.9510 | 0.0699 |  |  |
| 11 | 27.7747 | 4.1853 | 1.84666 | 23.78 |
| 12 | −26.3538 | 0.3785 |  |  |
| 13 | −21.6730 | 0.9000 | 1.80610 | 40.94 |
| 14 | 142.5913 | D14 |  |  |
| 15 |  | 0.5000 | Aperture Stop S | |
| 16 | 23.9195 | 5.8645 | 1.48749 | 70.24 |
| 17 | −24.9715 | 2.6130 |  |  |
| 18 | −18.2217 | 0.9000 | 1.80400 | 46.58 |
| 19 | −41.8914 | D19 |  |  |
| 20 | 41.3191 | 4.9980 | 1.51742 | 52.42 |
| 21 | −70.8432 | 0.1298 |  |  |
| 22 | 475.9332 | 4.9998 | 1.49700 | 81.61 |
| 23 | −23.9450 | 0.1106 |  |  |
| 24 | −30.6076 | 2.3955 | 1.84666 | 23.78 |
| 25 | −119.1001 | 2.2608 |  |  |
| 26* | −54.4252 | 0.2000 | 1.55389 | 38.09 |
| 27 | −40.7481 | 4.9993 | 1.53172 | 48.87 |
| 28 | −31.9717 | Bf |  |  |

[Aspherical Data]

Surface Number 6

κ = 0.0000
C4 = 1.20340E−05
C6 = −1.77940E−08
C8 = −1.94350E−11
C10 = 3.50120E−13
C12 = 0.0000

Surface Number 26

κ = 0.0000
C4 = −2.95570E−05
C6 = −3.32740E−08
C8 = −1.47290E−10
C10 = 0.0000
C12 = 0.0000

(Variable Distances)

|  | W | M | T |
|---|---|---|---|
| f | 18.52 | 70.00 | 131.00 |
| D5 | 2.47 | 34.66 | 45.69 |
| D14 | 22.70 | 8.01 | 2.90 |
| D19 | 8.92 | 2.98 | 1.20 |
| Bf | 40.09 | 62.98 | 71.13 |

[Values for Conditional Expressions]

(1): 100 · (D3w − D3t)/(Z · IL) = 3.87
(2): 10 · (D2w − D2t)/(Z · IL) = 0.99
(3): f3/f4 = 1.43
(4): fw = 18.52
    f1 = 86.671
    ft = 131.00
(5): fw/IL = 0.66
(6): fw/(−f2) = 1.42

Figure 4A:
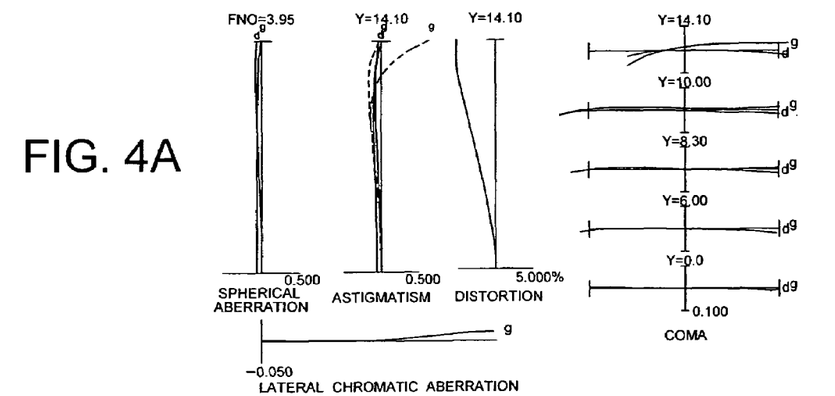
FIG. 4A shows various aberrations in a wide-angle end state W.
Figure 4B:
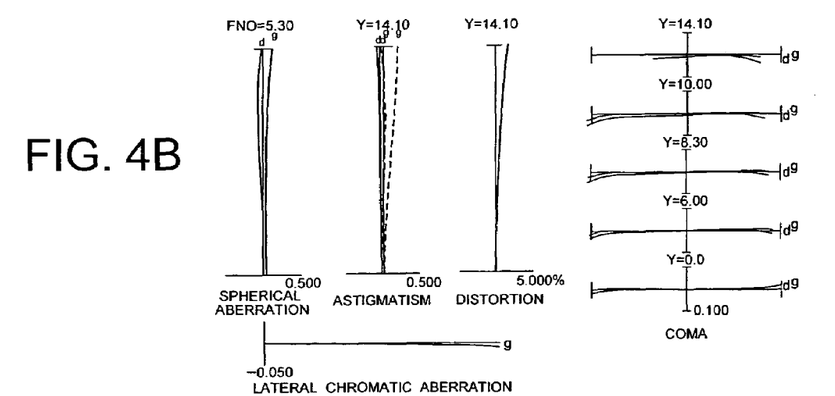
FIG. 4B shows various aberrations in an intermediate focal length state M.
Figure 4C:
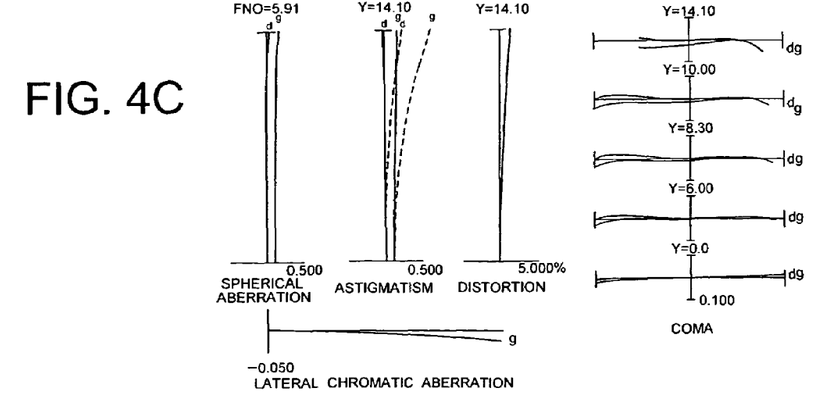
FIG. 4C shows various aberrations in a telephoto end state T.

FIGS. 4A, 4B, and 4C are graphs showing various aberrations of the zoom lens system according to Example 2 focusing on infinity in which FIG. 4A shows various aberrations in a wide-angle end state W, FIG. 4B shows various aberrations in an intermediate focal length state M, and FIG. 4C shows various aberrations in a telephoto end state T.

As is apparent from the respective graphs, the zoom lens system according to Example 2 shows superb optical performance as a result of good corrections to various aberrations in the wide-angle end state, in the intermediate focal length state, and in the telephoto end state.

EXAMPLE 3

Figure 5:
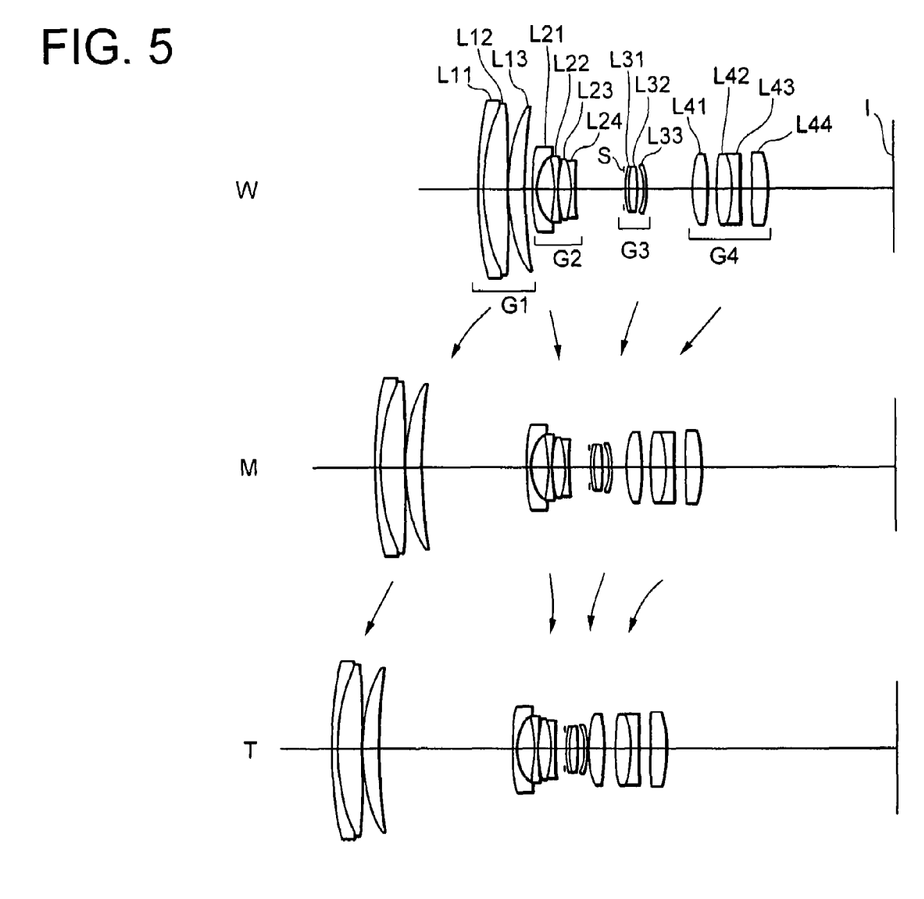
FIG. 5 is a diagram showing a lens configuration of a zoom lens system according to Example 3 together with zooming trajectories of respective lens groups.

FIG. 5 is a diagram showing a lens configuration of a zoom lens system according to Example 3 together with zooming trajectories of respective lens groups.

The zoom lens system according to Example 3 is composed of, in order from the object, a first lens group G1 having positive refractive power, a second lens group G2 having negative refractive power, a third lens group G3 having positive refractive power, and a fourth lens group G4 having positive refractive power. When zooming from a wide-angle end state (W) to a telephoto end state (T), respective lens groups G1, G2, G3, and G4 are moved along the optical axis such that a distance between the first lens group G1 and the second lens group G2 increases, a distance between the second lens group G2 and the third lens group G3 decreases, and a distance between the third lens group G3 and the fourth lens group G4 decreases.

The first lens group G1 is composed of, in order from the object, a cemented lens constructed by a negative meniscus lens L11 having a convex surface facing the object cemented with a double convex positive lens L12, and a positive meniscus lens L13 having a convex surface facing the object.

The second lens group G2 is composed of, in order from the object, a negative meniscus lens L21 having a convex surface facing the object, a double concave negative lens L22, a double convex positive lens L23, and a double concave negative lens L24.

The third lens group G3 is composed of, in order from the object, an aperture stop S, a negative meniscus lens L31 having a convex surface facing the object, a double convex positive lens L32, and a negative meniscus lens L33 having a convex surface facing the image. The aperture stop S is moved in a body together with respective lenses composing the third lens group upon zooming.

The fourth lens group G4 is composed of, in order from the object, a double convex positive lens L41, a double convex positive lens L42, a double concave negative lens L43, and a double convex positive lens L44.

Various values associated with the zoom lens system according to Example 3 are listed in Table 3.

TABLE 3

[Specifications]

|  | W | T |
|---|---|---|
| f = | 18.5 | 130.9 |
| FNO = | 3.8 | 5.9 |
| 2ω = | 77.6 | 12.2° |

[Lens Data]

| | r | d | n | ν |
|---|---|---|---|---|
| 1 | 164.0905 | 1.5000 | 1.846660 | 23.78 |
| 2 | 67.6857 | 8.0837 | 1.618000 | 63.38 |
| 3 | −613.2094 | 0.1000 | | |
| 4 | 53.0522 | 5.5000 | 1.772500 | 49.61 |

TABLE 3-continued

| | | | | |
|---|---|---|---|---|
| 5 | 131.2460 | D5 | | |
| 6* | 107.6967 | 0.2000 | 1.553890 | 38.09 |
| 7 | 100.6081 | 1.0000 | 1.804000 | 46.58 |
| 8 | 14.2885 | 5.9799 | | |
| 9 | −37.4985 | 0.9000 | 1.772500 | 49.61 |
| 10 | 60.0005 | 0.0044 | | |
| 11 | 28.8752 | 4.3000 | 1.846660 | 23.78 |
| 12 | −33.0419 | 0.3511 | | |
| 13 | −26.4340 | 0.9000 | 1.806100 | 40.94 |
| 14 | 73.0574 | D14 | | |
| 15 | | 0.5000 | Aperture Stop S | |
| 16 | 31.8505 | 1.0000 | 1.785900 | 44.20 |
| 17 | 21.6830 | 2.8000 | 1.531720 | 48.87 |
| 18 | −45.9949 | 1.9509 | | |
| 19 | −22.0786 | 0.9000 | 1.804000 | 46.58 |
| 20 | −40.6412 | D20 | | |
| 21 | 29.5499 | 5.0004 | 1.516330 | 64.14 |
| 22 | −95.1249 | 3.2225 | | |
| 23 | 54.8850 | 5.0000 | 1.497000 | 81.61 |
| 24 | −36.1062 | 0.1776 | | |
| 25 | −43.1181 | 2.3853 | 1.846660 | 23.78 |
| 26 | 267.3975 | 3.8599 | | |
| 27* | 241.5414 | 0.2000 | 1.553890 | 38.09 |
| 28 | 241.5414 | 5.0000 | 1.581440 | 40.75 |
| 29 | −64.6981 | Bf | | |

[Aspherical Data]

Surface Number 6

κ = 0.0000
C4 = 9.56370E−06
C6 = −4.93930E−09
C8 = −6.74420E−11
C10 = 2.99380E−13
C12 = 0.0000

Surface Number 27

κ = 0.0000
C4 = −2.42330E−05
C6 = −1.88300E−08
C8 = −9.25330E−11
C10 = 0.0000
C12 = 0.0000

[Variable Distances]

| | W | M | T |
|---|---|---|---|
| f | 18.50 | 70.00 | 131.00 |
| D5 | 2.46 | 33.89 | 43.65 |
| D14 | 16.35 | 6.40 | 2.90 |
| D20 | 14.93 | 4.79 | 1.10 |
| Bf | 41.24 | 64.70 | 77.50 |

[Values for Conditional Expressions]

(1): 100 · (D3w − D3t)/(Z · IL) = 6.95
(2): 10 · (D2w − D2t)/(Z · IL) = 0.68
(3): f3/f4 = 3.32
(4): fw = 18.54
    f1 = 85.748
    ft = 130.95
(5): fw/IL = 0.66
(6): fw/(−f2) = 1.42

Figure 6A:
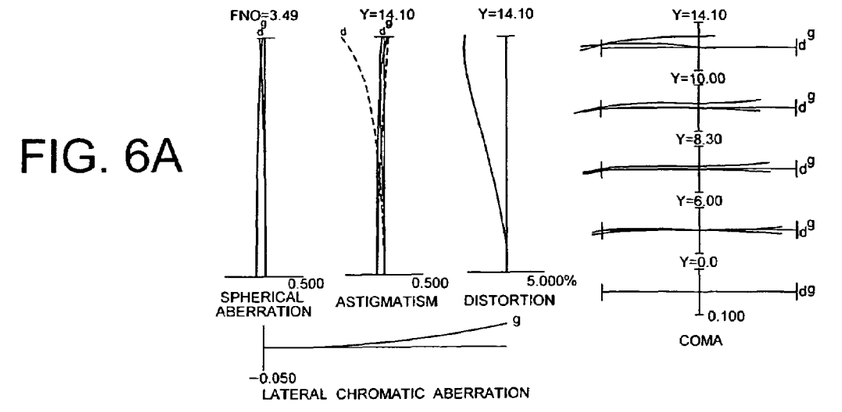
FIG. 6A shows various aberrations in a wide-angle end state W.
Figure 6B:
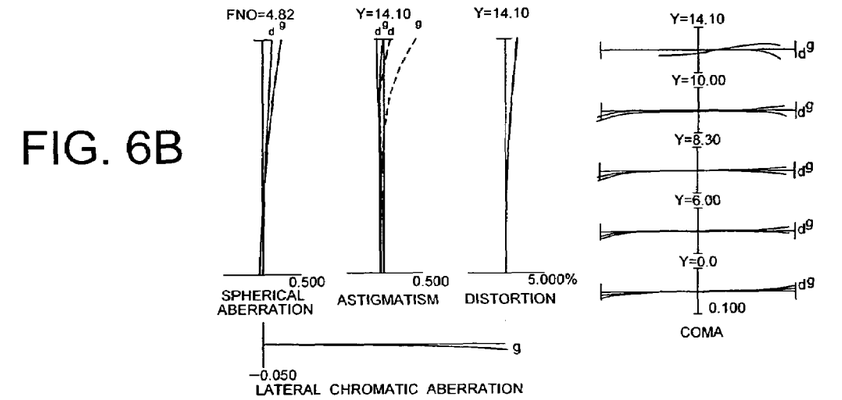
FIG. 6B shows various aberrations in an intermediate focal length state M.
Figure 6C:
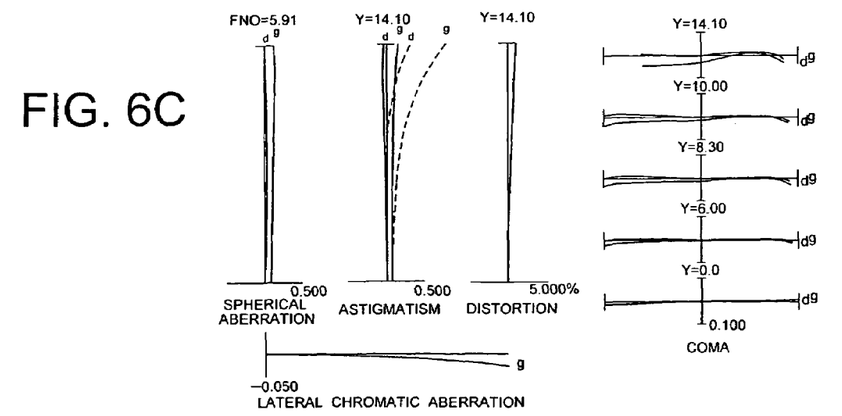
FIG. 6C shows various aberrations in a telephoto end state T.

FIGS. 6A, 6B, and 6C are graphs showing various aberrations of the zoom lens system according to Example 3 focusing on infinity in which FIG. 6A shows various aberrations in a wide-angle end state W, FIG. 6B shows various aberrations in an intermediate focal length state M, and FIG. 6C shows various aberrations in a telephoto end state T.

As is apparent from the respective graphs, the zoom lens system according to Example 3 shows superb optical performance as a result of good corrections to various aberrations in the wide-angle end state, in the intermediate focal length state, and in the telephoto end state.

EXAMPLE 4

Figure 7:
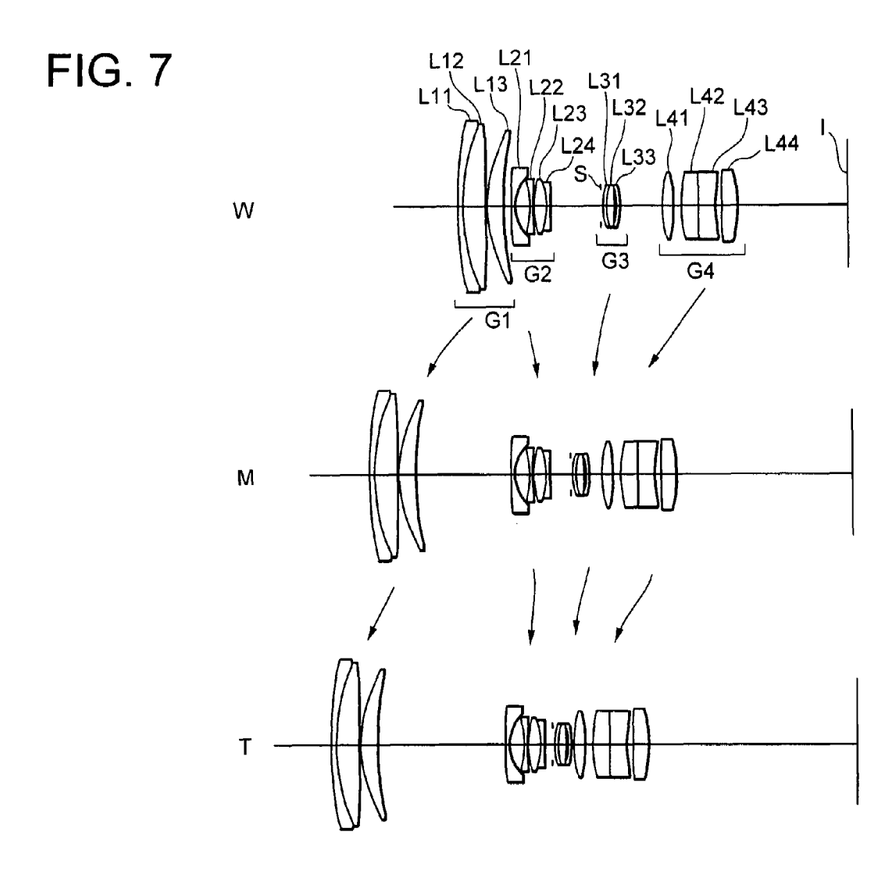
FIG. 7 is a diagram showing a lens configuration of a zoom lens system according to Example 4 together with zooming trajectories of respective lens groups.

FIG. 7 is a diagram showing a lens configuration of a zoom lens system according to Example 4 together with zooming trajectories of respective lens groups.

The zoom lens system according to Example 4 is composed of, in order from the object, a first lens group G1 having positive refractive power, a second lens group G2 having negative refractive power, a third lens group G3 having positive refractive power, and a fourth lens group G4 having positive refractive power. When zooming from a wide-angle end state (W) to a telephoto end state (T), respective lens groups G1, G2, G3, and G4 are moved along the optical axis such that a distance between the first lens group G1 and the second lens group G2 increases, a distance between the second lens group G2 and the third lens group G3 decreases, and a distance between the third lens group G3 and the fourth lens group G4 decreases.

The first lens group G1 is composed of, in order from the object, a cemented lens constructed by a negative meniscus lens L11 having a convex surface facing the object cemented with a double convex positive lens L12, and a positive meniscus lens L13 having a convex surface facing the object.

The second lens group G2 is composed of, in order from the object, a negative meniscus lens L21 having a convex surface facing the object, a double concave negative lens L22, a double convex positive lens L23, and a double concave negative lens L24.

The third lens group G3 is composed of, in order from the object, an aperture stop S, a cemented lens constructed by a negative meniscus lens L31 having a convex surface facing the object cemented with a double convex positive lens L32, and a negative meniscus lens L33 having a convex surface facing the image. The aperture stop S is moved in a body together with respective lenses composing the third lens group upon zooming.

The fourth lens group G4 is composed of, in order from the object, a double convex positive lens L41, a cemented lens constructed by a double convex positive lens L42 cemented with a double concave negative lens L43, and a double convex positive lens L44.

Various values associated with the zoom lens system according to Example 4 are listed in Table 4.

TABLE 4

[Specifications]

| | W | T |
|---|---|---|
| f = | 18.5 | 130.9 |
| FNO = | 3.8 | 5.9 |
| 2ω = | 77.7 | 12.2° |

[Lens Data]

| | r | d | n | ν |
|---|---|---|---|---|
| 1 | 160.9952 | 1.5000 | 1.846660 | 23.78 |
| 2 | 69.9752 | 8.2235 | 1.618000 | 63.38 |
| 3 | −460.9193 | 0.1000 | | |
| 4 | 50.4345 | 5.5939 | 1.696800 | 55.52 |
| 5 | 123.3902 | D5 | | |
| 6* | 146.2960 | 0.2000 | 1.553890 | 38.09 |
| 7 | 127.5372 | 1.0000 | 1.804000 | 46.58 |
| 8 | 14.2844 | 5.4973 | | |

TABLE 4-continued

| 9 | −36.3574 | 0.9000 | 1.772500 | 49.61 |
|---|---|---|---|---|
| 10 | 77.5767 | 0.1000 | | |
| 11 | 29.5571 | 4.3194 | 1.846660 | 23.78 |
| 12 | −28.7383 | 0.4258 | | |
| 13 | −22.9928 | 0.9000 | 1.806100 | 40.94 |
| 14 | 85.0453 | D14 | | |
| 15 | | 0.5000 | Aperture Stop S | |
| 16 | 29.9631 | 1.0000 | 1.772500 | 49.61 |
| 17 | 19.5204 | 2.8000 | 1.516330 | 64.14 |
| 18 | −59.0056 | 0.6843 | | |
| 19 | −23.2552 | 0.9000 | 1.772500 | 49.61 |
| 20 | −37.5814 | D20 | | |
| 21 | 29.8651 | 3.9090 | 1.487490 | 70.24 |
| 22 | −83.2754 | 2.7420 | | |
| 23 | 38.5230 | 6.0000 | 1.497000 | 81.61 |
| 24 | −5133.4430 | 5.7732 | 1.846660 | 23.78 |
| 25 | 44.4688 | 1.7212 | | |
| 26* | 64.6715 | 0.1000 | 1.553890 | 38.09 |
| 27 | 69.8192 | 5.2636 | 1.487490 | 70.24 |
| 28 | −54.9618 | Bf | | |

[Aspherical Data]

Surface Number 6

$\kappa = 0.0000$
$C4 = 1.07390E{-}05$
$C6 = 6.27270E{-}09$
$C8 = -1.23500E{-}10$
$C10 = 4.99830E{-}13$
$C12 = 0.0000$ Surface Number 26

$\kappa = 0.0000$
$C4 = -2.77660E{-}05$
$C6 = -2.00490E{-}08$
$C8 = -1.54290E{-}10$
$C10 = 0.0000$
$C12 = 0.0000$

[Variable Distances]

| | W | M | T |
|---|---|---|---|
| f | 18.54 | 70.00 | 131.00 |
| D5 | 2.51 | 32.84 | 43.08 |
| D14 | 17.64 | 6.80 | 2.90 |
| D20 | 14.4674 | 4.3874 | 1.1474 |
| Bf | 38.00 | 64.70 | 77.50 |

[Values for Conditional Expressions]

Figure 8A:
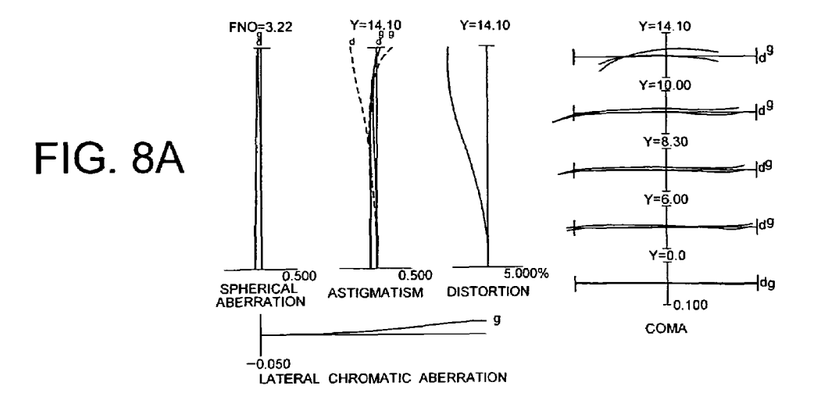
FIG. 8A shows various aberrations in a wide-angle end state W.
Figure 8B:
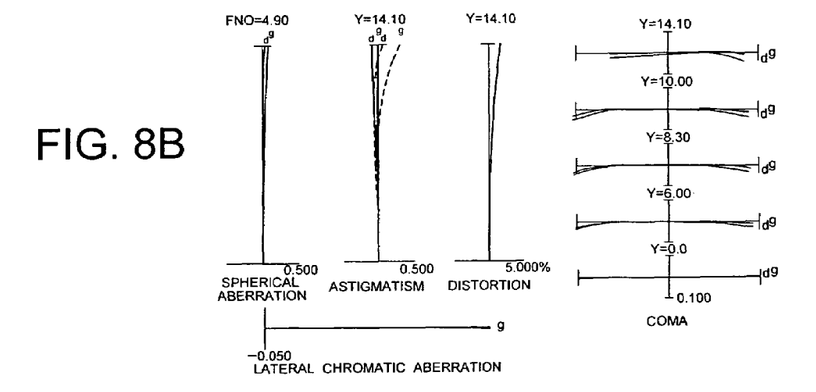
FIG. 8B shows various aberrations in an intermediate focal length state M.
Figure 8C:
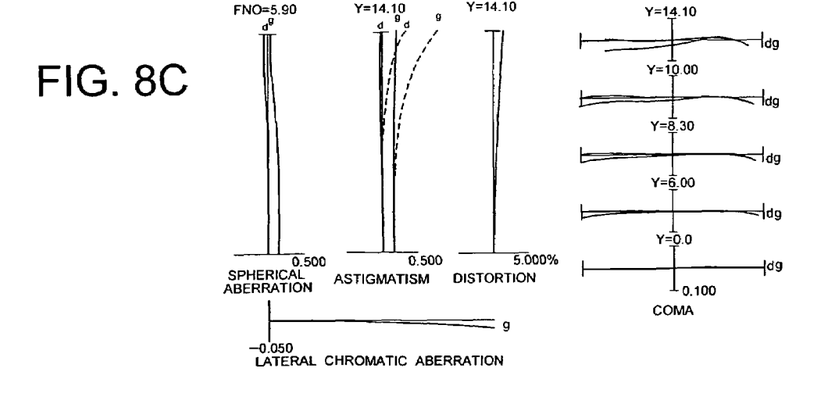
FIG. 8C shows various aberrations in a telephoto end state T.

(1): $100 \cdot (D3w - D3t)/(Z \cdot IL) = 6.69$
(2): $10 \cdot (D2w - D2t)/(Z \cdot IL) = 0.74$
(3): $f3/f4 = 3.24$
(4): $fw = 18.54$
    $f1 = 85.544$
    $ft = 130.95$
(5): $fw/IL = 0.66$
(6): $fw/(-f2) = 1.39$ FIGS. 8A, 8B, and 8C are graphs showing various aberrations of the zoom lens system according to Example 4 focusing on infinity in which FIG. 8A shows various aberrations in a wide-angle end state W, FIG. 8B shows various aberrations in an intermediate focal length state M, and FIG. 8C shows various aberrations in a telephoto end state T.

As is apparent from the respective graphs, the zoom lens system according to Example 4 shows superb optical performance as a result of good corrections to various aberrations in the wide-angle end state, in the intermediate focal length state, and in the telephoto end state.

As described above, the present invention makes it possible to provide a zoom lens system that has a high zoom ratio, high optical performance, and compactness, and is easy to be manufactured.

It is needless to say that although a zoom lens system with a four-lens-group configuration is shown in each Example of the present invention, a zoom lens system simply added by a lens group to a four-lens-group configuration is included in the spirit of the present invention. Moreover, in the configuration of each lens group, a lens group simply added by additional lens elements to the lens group shown in each Example is included in the spirit or scope of the present invention.

Additional advantages and modifications will readily occur to those skilled in the art. Therefore, the invention in its broader aspect is not limited to the specific details, and representative devices shown and described herein. Accordingly, various modifications may be made without departing from the spirit or scope of the general inventive concept as defined by the appended claims and their equivalents.

What is claimed is:

1. A zoom lens system comprising, in order from an object:
   a first lens group having positive refractive power;
   a second lens group having negative refractive power;
   a third lens group having positive refractive power; and
   a fourth lens group having positive refractive power,
   zooming from a wide-angle end state to a telephoto end state being carried out by moving each lens group along the optical axis such that a distance between the first lens group and the second lens group increases, a distance between the second lens group and the third lens group decreases, and a distance between the third lens group and the fourth lens group decreases,
   a zoom ratio of the zoom lens system being 5.0 or more, and
   the following conditional expressions being satisfied:

$2.78 \leq 100 \cdot (D3w - D3t)/(Z \cdot IL) \leq 9.1$ $0.55 \leq 10 \cdot (D2w - D2t)/(Z \cdot IL) \leq 3.1$ $0.81 \leq f3/f4 \leq 6.0$ where D2w denotes a distance between the second lens group and the third lens group in the wide-angle end state upon focusing on infinity, D2t denotes a distance between the second lens group and the third lens group in the telephoto end state upon focusing on infinity, D3w denotes a distance between the third lens group and the fourth lens group in the wide-angle end state upon focusing on infinity, D3t denotes a distance between the third lens group and the fourth lens group in the telephoto end state upon focusing on infinity, IL denotes a diagonal length of an effective image, f3 denotes a focal length of the third lens group, f4 denotes a focal length of the fourth lens group, and Z denotes a zoom ratio.

2. The zoom lens system according to claim 1, wherein the following conditional expressions are satisfied:

$3.35 \cdot fw \leq f1 \leq 0.67 \cdot ft$ $0.55 \leq fw/IL \leq 0.83$ where fw denotes a focal length of the zoom lens system in the wide-angle end state, ft denotes a focal length of the zoom lens system in the telephoto end state, and f1 denotes a focal length of the first lens group.

3. The zoom lens system according to claim 2, wherein the following conditional expression is satisfied:

$1.1 < fw/(-f2) < 2.2$ where fw denotes a focal length of the zoom lens system in the wide-angle end state, and f2 denotes a focal length of the second lens group.

4. The zoom lens system according to claim 1, wherein the following conditional expression is satisfied:

$1.1 < fw/(-f2) < 2.2$ where fw denotes a focal length of the zoom lens system in the wide-angle end state, and f2 denotes a focal length of the second lens group.

5. The zoom lens system according to claim 1, wherein the first lens group includes, in order from the object, a cemented lens constructed by a negative meniscus lens having a convex surface facing the object cemented with a double convex positive lens, and a positive meniscus lens having a convex surface facing the object.

6. The zoom lens system according to claim 1, wherein the second lens group includes, in order from the object, a negative lens, a negative lens, a positive lens, and a negative lens.

7. The zoom lens system according to claim 6, wherein the second lens group includes, in order from the object, a negative lens that has stronger curvature on the image side surface than on the object side surface and has a concave surface facing the image, a double concave negative lens, a double convex positive lens, and a negative lens that has stronger curvature on the object side surface than on the image side surface and has a concave surface facing the object.

8. The zoom lens system according to claim 1, wherein the most object side lens surface of the second lens group is an aspherical surface.

9. The zoom lens system according to claim 1, wherein the third lens group has an aperture stop on the most object side thereof.

10. The zoom lens system according to claim 1, wherein the third lens group includes, in order from the image, a negative lens, and a positive lens.

11. The zoom lens system according to claim 1, wherein the third lens group is composed of three lenses or less.

12. The zoom lens system according to claim 1, wherein the fourth lens group includes at least one aspherical surface.

13. The zoom lens system according to claim 1, wherein the fourth lens group includes, in order from the object, a positive lens, a positive lens, a negative lens, and a positive lens.

14. The zoom lens system according to claim 1, wherein only spherical surfaces are used on the lens surfaces of the first lens group.

15. A method for forming an image of an object and varying a focal length of a zoom lens system that includes, in order from the object, a first lens group having positive refractive power, a second lens group having negative refractive power, a third lens group having positive refractive power, and a fourth lens group having positive refractive power, comprising steps of:
   varying the focal length by moving each lens group along an optical axis, increasing a distance between the first lens group and the second lens group, decreasing a distance between the second lens group and the third lens group, and decreasing a distance between the third lens group and the fourth lens group when the zoom lens system moves from a wide-angle end state to a telephoto end state,
securing a zoom ratio of 5.0 or more, and
satisfying the following conditional expressions:

$$2.78 \leq 100 \cdot (D3w-D3t)/(Z \cdot IL) \leq 9.1$$

$$0.55 \leq 10 \cdot (D2w-D2t)/(Z \cdot IL) \leq 3.1$$

$$0.81 \leq f3/f4 \leq 6.0$$

where D2w denotes a distance between the second lens group and the third lens group in the wide-angle end state upon focusing on infinity, D2t denotes a distance between the second lens group and the third lens group in the telephoto end state upon focusing on infinity, D3w denotes a distance between the third lens group and the fourth lens group in the wide-angle end state upon focusing on infinity, D3t denotes a distance between the third lens group and the fourth lens group in the telephoto end state upon focusing on infinity, IL denotes a diagonal length of an effective image, f3 denotes a focal length of the third lens group, f4 denotes a focal length of the fourth lens group, and Z denotes a zoom ratio.

16. The method for forming an image of an object and varying a focal length of a zoom lens system according to claim 15, further comprising a step of:
satisfying the following conditional expressions:

$$3.35 \cdot fw \leq f1 \leq 0.67 \cdot ft$$

$$0.55 \leq fw/IL \leq 0.83$$

where fw denotes a focal length of the zoom lens system in the wide-angle end state, ft denotes a focal length of the zoom lens system in the telephoto end state, and f1 denotes a focal length of the first lens group.

17. The method for forming an image of an object and varying a focal length of a zoom lens system according to claim 15, further comprising a step of:
satisfying the following conditional expressions:

$$1.1 < fw/(-f2) < 2.2$$

where fw denotes a focal length of the zoom lens system in the wide-angle end state, and f2 denotes a focal length of the second lens group.

* * * * *